United States Patent
Nakamura

[11] Patent Number: 6,135,474
[45] Date of Patent: *Oct. 24, 2000

[54] VEHICLE FRAME

[75] Inventor: Yasushi Nakamura, Itami, Japan

[73] Assignee: Shimano, Inc., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/890,742

[22] Filed: Jul. 11, 1997

[30] Foreign Application Priority Data

Jul. 17, 1996 [JP] Japan ................................ 8-187436

[51] Int. Cl.$^7$ ................................................. B62M 23/02
[52] U.S. Cl. ........................................ 280/216; 280/288.3
[58] Field of Search ................................... 280/212, 215, 280/216, 201, 288.3, 281, 284, 285, 286

[56] References Cited

U.S. PATENT DOCUMENTS

| | | | |
|---|---|---|---|
| 849,227 | 4/1907 | Genelly | 280/201 |
| 1,410,326 | 3/1922 | Labak | 280/216 |
| 3,581,845 | 6/1971 | Nederynen | 184/7 D |
| 3,729,213 | 4/1973 | Hudspeth et al. | 280/216 |
| 4,352,503 | 10/1982 | Cotter | 280/238 |
| 4,568,097 | 2/1986 | Farooq | 280/216 |
| 4,684,143 | 8/1987 | Sato | 280/216 |
| 4,688,815 | 8/1987 | Smith | 280/216 |
| 4,705,286 | 11/1987 | Lauzier et al. | 280/281 R |
| 4,856,801 | 8/1989 | Hollingsworth | 280/284 |
| 4,900,050 | 2/1990 | Bishop et al. | 280/281.1 |
| 4,941,674 | 7/1990 | Trimble | 280/281.1 |
| 4,942,936 | 7/1990 | Gardner, Jr. | 280/216 |
| 5,098,114 | 3/1992 | Jones | 280/284 |
| 5,143,390 | 9/1992 | Goldsmith | 280/201 |
| 5,411,448 | 5/1995 | Horii et al. | 477/102 |

FOREIGN PATENT DOCUMENTS

| | | |
|---|---|---|
| 120571 | 10/1984 | European Pat. Off. . |
| 0 120 571 A1 | 10/1984 | European Pat. Off. ....... B62M 25/08 |
| 2624085 | 6/1989 | France . |
| 3235387 A1 | 4/1984 | Germany . |
| 4223165 A1 | 11/1993 | Germany . |
| 96/22216 | 7/1996 | WIPO . |

OTHER PUBLICATIONS

*Hydraulics & Pneumatics,* Jul. 1982, vol. 35, No. 7, p. 14, "Air shifts bicycle gears . . . automatically."

Primary Examiner—Richard M. Camby
Assistant Examiner—Michael Cuff
Attorney, Agent, or Firm—James A. Deland

[57] ABSTRACT

A vehicle frame is constructed of a frame body including a head component for supporting a front wheel, a seat supporting component for supporting a seat, and a frame component coupled to the head component and to the seat supporting component. The frame component defines a sealed space that is hermetically sealed from the head component and the seat component. The frame component includes a gas opening disposed on a side surface thereof and displaced from the head component and the seat component so that the sealed space may be charged with a compressed gas. If desired, the frame component may include a separate opening for supplying compressed gas to another component mounted on the bicycle.

14 Claims, 4 Drawing Sheets

VEHICLE FRAME

BACKGROUND OF THE INVENTION

The present invention is directed to a vehicle frame and, more particularly, to a bicycle, tricycle or motorcycle frame capable of storing compressed gas inside the frame members thereof.

Vehicles driven by human power, such as bicycles, motor-assisted bicycles, and tricycles, have a frame and wheels that are rotatably supported by the frame and are mounted with air-filled rubber tires. In the case of a bicycle or motor-assisted bicycle, the frame usually comprises tubes made of metal or synthetic resin, and a space is formed on the inside of the frame. With a bicycle, for instance, a shift apparatus, a brake apparatus, or the like can be operated by using a pneumatic device that is lightweight and easy to operate. Of course, such devices usually require a compressed air source to operate them. In the case of a vehicle that is large and has a motor, such as an automobile, an air compressor can be mounted on board, but the installation of such a large compressed air source is a difficult proposition with a vehicle that is small, lightweight, and human-powered, such as a bicycle. When an gas actuated devices are used with a bicycle, it is possible to mount a small gas cylinder filled with liquefied gas, for example, on the bicycle. With bicycles that need to be lightweight, however, the installation of a small gas cylinder is a problem in that the weight of the cylinder makes the bicycle that much heavier. Light weight is a concern common to all vehicles driven by human power, and not just bicycles, and reducing the weight allows the running performance of the vehicle to be enhanced. Even if weight were not a problem, however, another problem with the use of a gas cylinder that has been charged with carbon dioxide or another liquefied gas as the compressed gas source is the difficulty of recharging the gas cylinder with gas when it runs out. This means that expensive gas cylinders have to be kept on hand at all times.

SUMMARY OF THE INVENTION

The present invention is directed to a vehicle frame having a construction with which compressed gas can be obtained easily and inexpensively in a bicycle or another such vehicle without increasing the weight of the vehicle. In one embodiment of the present invention, a vehicle frame is constructed of a frame body including a head component for supporting a front wheel, a seat supporting component for supporting a seat, and a frame component coupled to the head component and to the seat supporting component. The frame component defines a sealed space that is hermetically sealed from the head component and the seat component. The frame component includes a gas opening disposed on a side surface thereof and displaced from the head component and the seat component so that the sealed space may be charged with a compressed gas. If desired, the frame component may include a separate opening for supplying compressed gas to another component mounted on the bicycle.

In a more specific embodiment, the frame component is constructed of a down tube extending downward and rearward relative to the head component, a top tube extending rearward relative to the head component above the down tube, a seat tube disposed in an intermediate location relative to the seat supporting component and the bottom bracket component, a seat stay that forks downward and rearward relative to the top tube, and a chain stay that forks rearward relative to the bottom bracket component. In this case the sealed space is disposed within at least one of the down tube, the top tube, the seat tube, the seat stay and the chain stay. To maximize the storage capability of the vehicle frame, the interior spaces of the down tube, the top tube, the seat tube, the seat stay and the chain stay may be in fluid communication with each other for defining the sealed space.

DETAILED DESCRIPTION OF THE EMBODIMENTS

Figure 1:
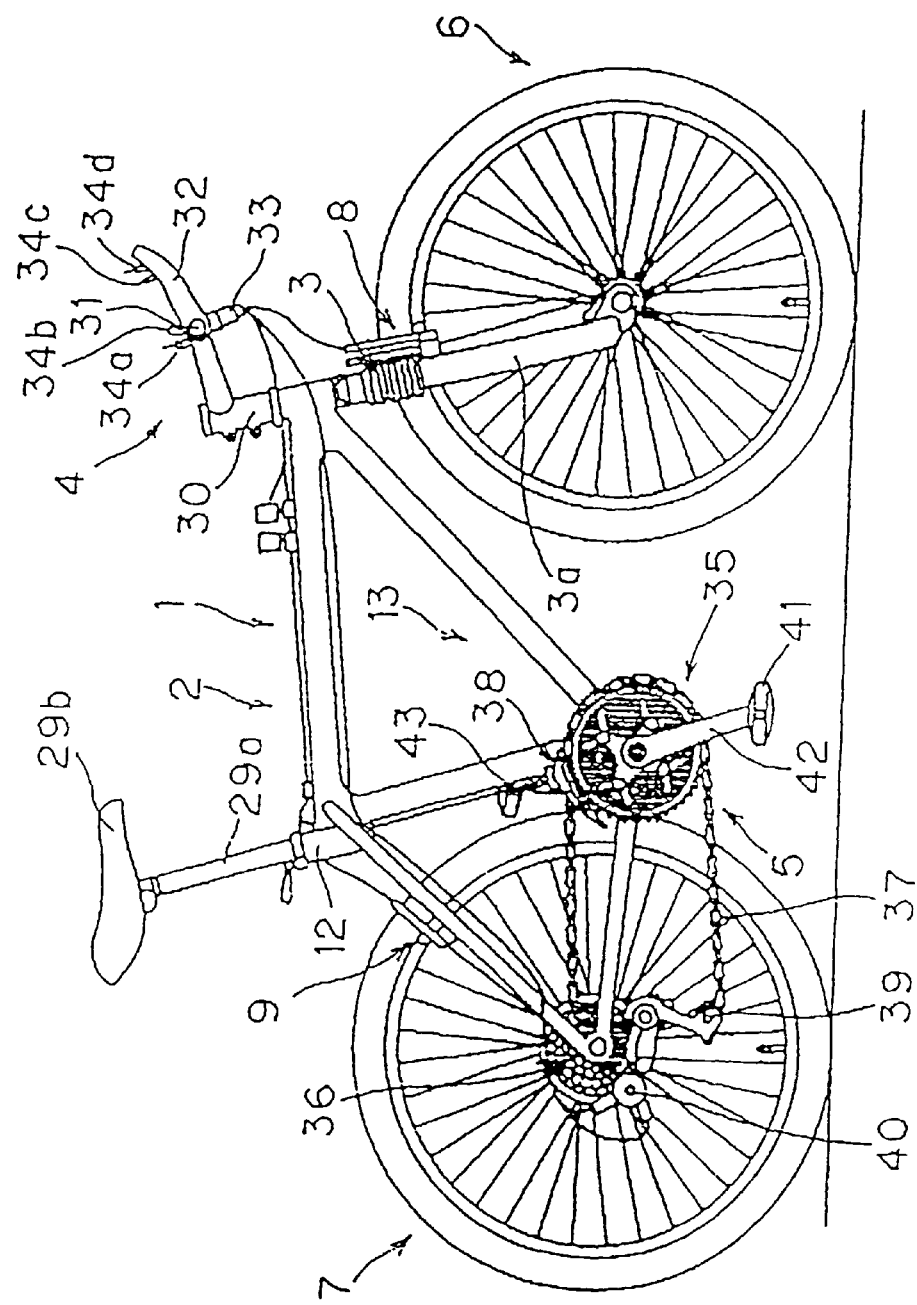
FIG. 1 is a side view of a bicycle which incorporates a particular embodiment of a vehicle frame according to the present invention.

In FIG. 1, an MTB type of bicycle to which an embodiment of the present invention has been applied is equipped with a diamond-shape frame 1 that makes up the skeleton of the chassis. The frame 1 has a frame body 2 consisting of a front triangle and a rear triangle, and a front fork 3 that is rotatably supported around a diagonal vertical axis by the front portion of the frame body 2 and that is equipped at its lower portion with two pneumatic suspensions 3a. The bicycle comprises a handle component 4 that is linked to the front fork 3, a drive component 5 that is attached to the lower portion of the frame body 2 and that converts pedaling force into drive force, a front wheel 6 that is detachably mounted to the lower end of the front fork 3, a rear wheel 7 that is detachably mounted to the rear end of the frame body 2, and front and rear brakes 8 and 9.

Figure 2:
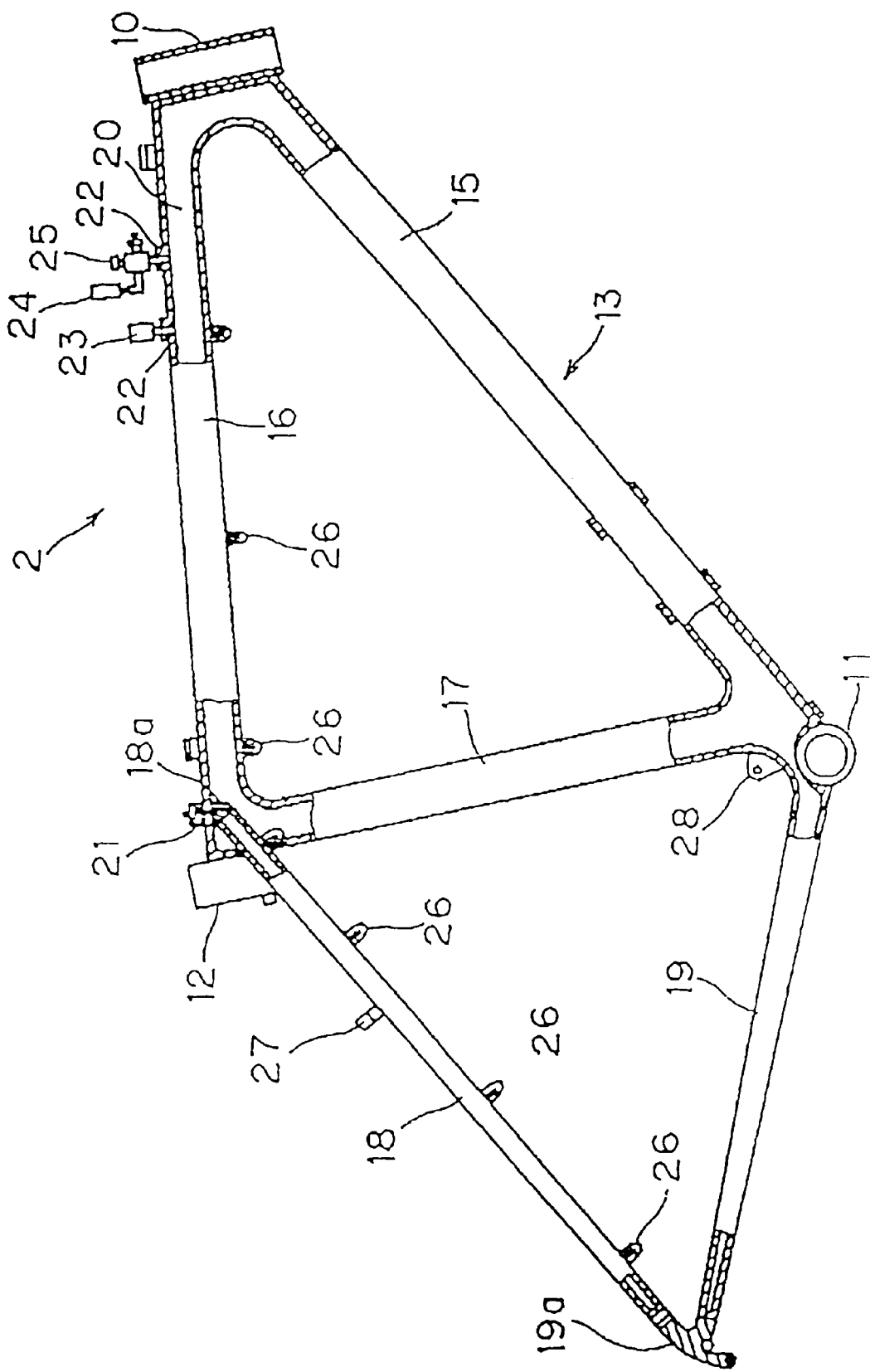
FIG. 2 is a partial cross sectional view of the vehicle frame shown in FIG. 1.

As shown in FIG. 2, the frame body 2 has a head component 10 that rotatably supports the front fork 3, a bottom bracket component 11 that is used to rotatably support a bottom bracket axle (not shown), a saddle fixing component 12 that is used to fix a saddle (discussed below), and tube frame members 13 that link the components 10 through 12. These components are manufactured by the welding of metal tubes composed of aluminum, chrome-moly steel, a titanium alloy, or another such material.

The tube frame members 13 comprise a down tube 15, a top tube 16, a seat tube 17, a seat stay 18, and a chain stay 19. The down tube 15 extends diagonally downward and rearward from the head component 10, and the bottom bracket component 11 is provided to the rear end of the down tube 15. The top tube 16 extends rearward from the head component 10 above the down tube 15. The seat tube 17 links the rear end of the top tube 16 with the rear end of the down tube 15. The cylindrical saddle fixing component 12 is fixed by welding to the rear portion of the seat tube 17. As shown in FIG. 1, a seat post 29a, to the upper end of which is fixed a saddle 29b, is fixed to this saddle fixing component 12 such that its vertical position can be adjusted. The seat stay 18 extends in a two-forked branch downward and rearward from the rear end of the top tube 16. The chain stay 19 extends in a two-forked branch rearward from the bottom bracket component 11 and is linked to the rear ends of the seat stay 18.

The insides of these tube frame members 13 are hermetically sealed off from the outside, and the spaces inside adjacent tubes communicate with each other and constitute a gas-charging component 20 that is capable of storing less than about 10 kg/cm$^2$ compressed air at the most. Here, the internal spaces of the down tube 15 and the top tube 16 communicate at the portion to the rear of the head component 10, while the internal space of the seat tube 17 communicates with those of the top tube 16 and the down tube 15 at the upper and lower ends, respectively, of the seat tube 17. The internal spaces of the top tube 16 and the seat stay 18 communicate via a communication hole 18a formed in the rear portion of the top tube 16, and the internal spaces of the down tube 15 and the chain stay 19 communicate at the upper portion of the bottom bracket component 11.

The upper surface of the top tube 16 is provided with a gas charging opening 21 that is used to charge the gas-charging component 20 with compressed gas, and two gas supply openings 22 that are used to supply the compressed gas stored on the inside to the outside. The gas charging opening 21 is provided to the rear portion of the top tube 16. A U.S. type of tire valve (schrader valve), for example, is mounted to the gas charging opening 21, and this construction allows compressed air to be charged easily by means of a bicycle air pump or an automobile air pump. The two gas supply openings 22 are provided in parallel in the longitudinal direction to the front portion of the top tube 16. A pressure gauge 23, which is used to display the base pressure inside the gas-charging component 20 and to display the amount of remaining gas, is mounted to one of the gas supply openings 22, and a pressure regulator 25, which is equipped with a pressure gauge 24, is mounted to the other of the gas supply openings 22. Air tube support rings 26 are provided at suitable intervals from the top tube 16 to the lower portion of the seat stay 18. In addition, a seat 27 that is used to mount a rear brake 9 is formed somewhere along the seat stay 18, and a bracket 28 that is used to mount a front derailleur (discussed below) is formed at the rear portion of the lower end of the seat tube 17.

As shown in FIG. 1, a handle stem 30, which constitutes the handle component 4, is fixed to the upper portion of the front fork 3. A handlebar 31 that extends to the left and right is fixed to the upper end of the handle stem 30. End bars 32 are mounted to the ends of the handlebar 31. Grips (not shown) are mounted on the inner side of the end bars 32. A brake lever 33 and a pair of shift valves 34a and 34b that is used to shift the derailleur 39 is attached on the inside of one of the grips. These shift valves 34a and 34b are normal close manual valves that have levers, and only allow air to pass through when the lever is operated. A pair of shift valves 34c and 34d is also provided to the distal end of one of the end bars 32. The shift valves 34a and 34c are used to shift from a higher gear to a lower gear, while the shift valves 34b and 34d are used to shift from a lower gear to a higher gear. As a result, the rider can shift the derailleur 39 on an uphill stretch, for example, while still gripping the end bars 32, that is, without taking his or her hands off the end bars 32. A brake lever (not shown) that is equipped with a shift lever for shifting a front derailleur (discussed below) is attached on the inside of the other grip.

The drive component 5 has a gear crank component 35 that is provided to the bottom bracket component 11, a hub cog component 36 that is attached to the free hub of the rear wheel 7, a chain 37 that goes around the gear crank component 35 and the hub cog component 36, a front derailleur 38 and a rear derailleur 39 that are used for shifting gears, and a shift operating mechanism 40 that is coupled with the rear derailleur 39 and an operating cable 44 (FIG. 3) and that is used to move the derailleur 39 reciprocally one gear at a time in the hub axle direction.

The gear crank component 35 has a right gear crank 42 and a left crank (not shown), to the distal ends of which are attached pedals 41. The right gear crank 42 and the left crank are coupled by a bottom bracket axle. The bottom bracket axle is rotatably supported by a the bottom bracket component 11. Three chainwheels, for example, with different numbers of teeth are mounted to the right gear crank 42 such that they are parallel in the bottom bracket axle direction. Eight hub cogs, for example, with different numbers of teeth are mounted to the hub cog component 36 such that they are parallel in the hub axle direction.

The front derailleur 38 has a chain guide component 43 composed of a pair of plates that guide the chain 37 in the direction parallel to the chainwheels in the gear crank component 35, and a link mechanism (not shown) that is used to rotatably support the chain guide component 43 generally parallel to the chainwheels with respect to the frame 1. The front derailleur 38 is coupled to a shift lever that is attached to the handlebar 31 via a cable.

Figure 3:
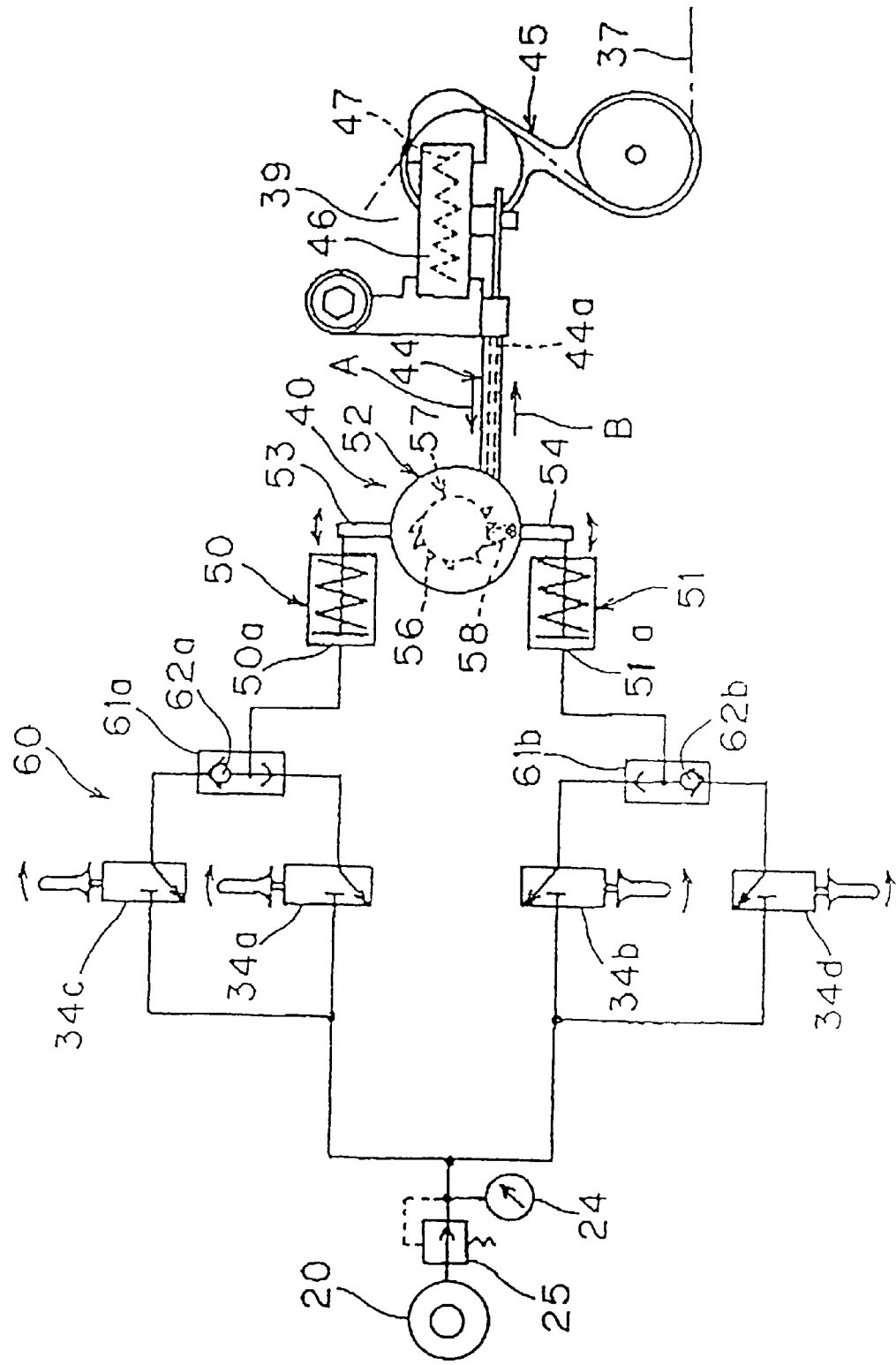
FIG. 3 is a schematic diagram of a gas actuated derailleur system that may be used in the bicycle shown in FIG. 1.

As shown in FIG. 3, the rear derailleur 39 has a chain guide component 45 having two sprockets that guide the chain 37 in the direction parallel to the hub cogs while applying tension to the chain 37, and a link mechanism 46 that is used to rotatably support the chain guide component 45 in the hub cog parallel direction with respect to the frame 1. The link mechanism 46 is fixed by a screw to a rear fork end 19a, and is biased by a spring 47 so that the chain guide component 45 is moved to the higher gear side.

The shift operating mechanism 40 is a type actuated by air, and has two air cylinders 50 and 51 and an operation component 52 that is operated by the air cylinders 50 and 51 and that is used to operate the rear derailleur 39. The operation component 52 has a swinging main arm 53 that is coupled to the air cylinder 50, a swinging release arm 54 that is coupled to the air cylinder 51, and a cable winder 57 that winds around its outer periphery the inner cable 44a of the operating cable 44. The cable winder 57 is designed to rotate in conjunction with the main arm 53, and a plurality of ratchet teeth 56 are formed around the outer periphery at specific intervals in the circumferential direction according to the parallel spacing of the hub cogs. A stop pawl 58 that engages with the ratchet teeth 56 is positioned on the outer peripheral side of the cable winder 57.

The air cylinders 50 and 51 are single-throw cylinders that each has a return spring on its inside, advance by a specific stroke when compressed air is supplied to supply openings 50a and 51a, and return to their home positions when this supply is stopped. The action of a single stroke of these air cylinders 50 and 51 causes the main arm 53 and the release arm 54 to swing by a specific angle back to their home positions. The swing and return of the main arm 53 by a specific angle causes the cable winder 57 to rotate in the cable winding direction by one ratchet tooth 56. This rotation causes the inner cable 44a of the operating cable 44 to be pulled in the direction of the arrow A, and causes the rear derailleur 39 to move to the lower gear side. As soon as the release arm 54 swings back in place, the stop pawl 58 instantly retracts from the ratchet teeth 56. As a result, the cable winder 57 rotates in the cable play-out direction by one ratchet tooth 56. This reverse rotation causes the inner cable 44a of the operating cable 44 to be played out in the direction of the arrow B, and causes the rear derailleur 39 to move to the higher gear side.

An air control component 60 is positioned between the gas-charging component 20 and the air cylinders 50 and 51. The air control component 60 has the four shift valves 34a through 34d, and shuttle valves 61a and 61b that are connected to the outlet side ports of the shift valves 34a and 34c and to the outlet side ports of the shift valves 34b and 34d, respectively. The four shift valves 34a through 34d are normal close, three-port, manual valves that each have a lever, as mentioned above, and only connect the inlet ports to the outlet ports and allow air to pass through when the lever is operated. When the lever is released and return to its home position, the outlet side port is connected with the exhaust port, and the air in the system is let out from the outlet side port on down.

The inlet side ports of the shift valves 34a through 34d are connected to the regulator 25, and the exhaust ports open to the outside. The shuttle valve 61a (or 61b) is provided so that one of the shift valves 34a and 34c (or 34b and 34d) will not leak air when the other shift valve 34c or 34a has been operated, and is provided in order to select the operation of either the shift valve 34a or 34c (or 34b or 34d). The outlet side ports of the shuttle valves 61a and 61b are connected to the supply openings 50a and 51a of the air cylinders 50 and 51, respectively. The various valves and cylinders are connected by air tubes.

The shifting of the bicycle rear derailleur 39 by means of the compressed air stored in the gas-charging component 20 will now be described.

Before the bicycle is to be used, the gas-charging component 20 is charged with compressed air. Here, for example, a U.S. tire valve adapter that is connected to a compressor for pumping air into automobile tires at a service station or the like is mounted to the gas charging opening 21. The gas-charging component 20 is then charged with about 5 to 8 kg/cm$^2$ of compressed air, for example. The supply pressure is adjusted to about 2 kg/cm$^2$ by the regulator 25. When the pressure on the pressure gauge 23 has dropped to 2 kg/cm$^2$, for example, and is equal to the supply pressure, the compressed gas will not be output from the gas storage component 20. Therefore, in this case, compressed air must again be charged into the gas-charging component 20.

The lever of the shift valve 34a or 34c is operated one time when the rear derailleur 39 is to be shifted from a higher to a lower gear. When the shift valve 34a or 34c is operated one time, the compressed air that has been adjusted to about 2 kg/cm$^2$ by the regulator is supplied to the air cylinder 50 through the shift valve 34a or 34c and the shuttle valve 61a while the lever is held. At this point, a valve body 62a on the inside of the shuttle valve 61a is pushed by the compressed air in the direction opposite to the air supply direction, which prevents the back-flow of the compressed air into the outlet side port of the shift valve 34c or 34a on the reverse side.

When air is supplied to the air cylinder 50, the cylinder rod of the air cylinder 50 advances by a specific stroke and causes the main arm 53 to swing a specific angle. As a result, the cable winder 57 rotates in the cable winding direction by one ratchet tooth 56. This rotation causes the inner cable 44a of the operating cable 44 to be pulled in the direction of the arrow A, and causes the rear derailleur 39 to move to the lower gear side. When the lever is then released, the outlet side port communicates with the exhaust port, which releases the pressure of the air inside the air cylinder 50, and the cylinder rod is returned by its spring to its home position. As a result, the main lever 53 also returns to its home position. Meanwhile, the cable winder 57 maintains the position it occupies after being rotated by the engagement between the stop pawl 58 and the ratchet teeth 56.

When the rear derailleur 39 is to be switched from a lower to a higher gear, the lever of the shift valve 34b or 34d is operated one time. When the shift valve 34b or 34d is operated one time, the compressed air is supplied to the air cylinder 51 through the shift valve 34b or 34d and the shuttle valve 61b while the lever is held. At this point, a valve body 62b on the inside of the shuttle valve 61b is pushed by the compressed air in the direction opposite to the air supply direction, which prevents the back-flow of the compressed air into the outlet side port of the shift valve 34d or 34b on the reverse side.

When air is supplied to the air cylinder 51, the cylinder rod of the air cylinder 51 advances by a specific stroke and causes the release arm 54 to swing a specific angle. As a result, the stop pawl 58 instantly retracts from the ratchet teeth 56, and the cable winder 57 rotates in the cable play-out direction by one ratchet tooth 56. This rotation causes the inner cable 44a of the operating cable 44 to be released in the direction of the arrow B, and causes the rear derailleur 39 to move to the higher gear side. When the lever is then released, the outlet side port communicates with the exhaust port, which releases the pressure of the air inside the air cylinder 50, and the cylinder rod is returned by its spring to its home position. As a result, the main lever 54 also returns to its home position. Meanwhile, the cable winder 57 maintains the position it occupies after being rotated by the engagement between the stop pawl 58 and the ratchet teeth 56.

With the present invention, since the compressed gas is stored in the gas-charging component 20 inside the frame 1, compressed gas can be obtained without any increase in weight. Also, if a valve that fits an ordinary air pump is mounted to the gas-charging component 20, the gas-charging component can be charged with compressed air with ease, allowing compressed gas to be obtained easily and inexpensively. Also, charging the inside of the frame 1 with compressed air results in the frame 1 being reinforced by the compressed air, which means that the rigidity of the frame 1 can be raised without any weight penalty.

Figure 4:
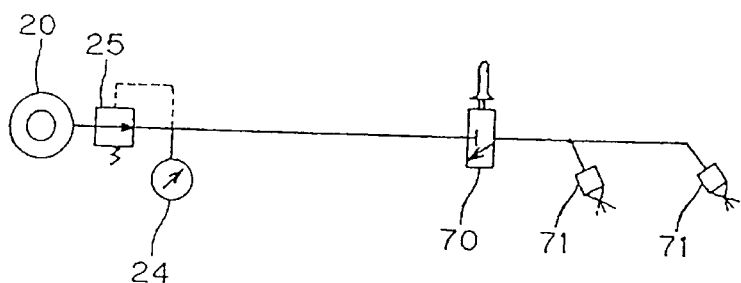
FIG. 4 is a schematic view of a gas actuated cleaning device that may be used in the bicycle shown in FIG. 1.

FIG. 4 is a schematic view of a gas actuated cleaning device that may be used in the bicycle shown in FIG. 1. As shown in FIG. 4, an air nozzle 71 may be position in the vicinity of the brake arms of the front and rear brakes 8 and 9, and a manual valve 70 similar to the shift valves may be positioned between the regulator 25 and the air nozzle 71. In this case, operation of the manual valve 70 will cause the compressed gas that has been charged into the gas-charging component 20 to be sprayed from the air nozzle 71, allowing any dirt or other foreign matter that is clogging the gas-charging component 20 to be removed, and allowing the braking force of the brakes 8 and 9 to be kept constant. The position of the air nozzle 71 is not limited to the brakes 8 and 9, and can also be any other site where cleaning is required.

Figure 5:
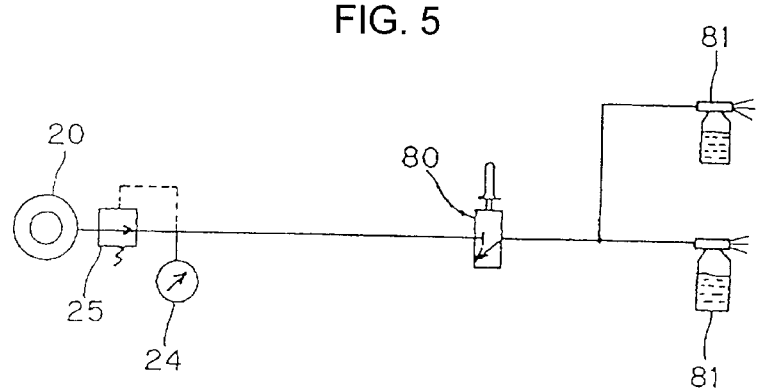
FIG. 5 is a schematic view of a lubricating device that may be used in the bicycle shown in FIG. 1.

FIG. 5 is a schematic view of a lubricating device that may be used in the bicycle shown in FIG. 1. As shown in FIG. 5, an oiling nozzle 81 in which lubricating oil is stored may be positioned at the hub cog component 36 and at the gear crank component 35 of the drive component 5, for example, and a manual valve 80 similar to the shift valves may be positioned between the regulator 25 and the air nozzle 71. In this case, operation of the manual valve 80 will cause lubricating oil to be sprayed in a mist from the oiling nozzle 81 along with the compressed gas that has been charged into the gas-charging component 20, so that the gear crank component 35 and the hub cog component 36 are suitably lubricated. The spraying of the lubricating oil also allows any dirt or other foreign matter that is adhered to the gear crank component 35 or the like to be removed. The position of the air nozzle 81 is not limited to the gear crank component 35 and the hub cog component 36, and can also be any other site where lubrication is required.

Figure 6:
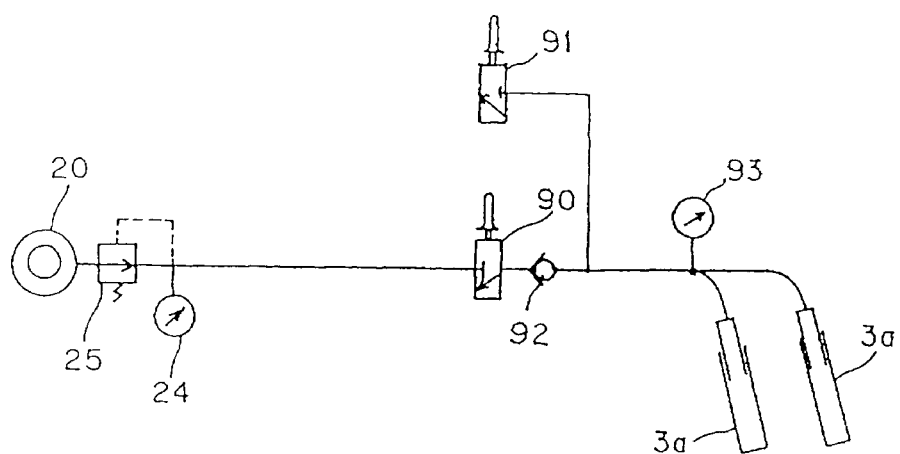
FIG. 6 is a schematic view of a gas controlled suspension mechanism that may be used in the bicycle shown in FIG. 1.

FIG. 6 is a schematic view of a gas controlled suspension mechanism that may be used in the bicycle shown in FIG. 1. As shown in FIG. 6, a manual valve 90 similar to the shift valves may be positioned between the regulator 25 and the suspension 3a in order to adjust the air pressure of the suspension 3a. In this case, since the outlet side port of the manual valve 90 is connected to a normal close exhaust port, a check valve 92 is positioned between the manual valve 90 and the suspension 3a. Also, a pressure gauge 93 that displays the air pressure inside the suspension 3a is positioned between the check valve 92 and the suspension 3a. Furthermore, an exhaust valve 91 is positioned in tubing that branches off from between the check valve 92 and the pressure gauge 93 in order to lower the air pressure inside the suspension 3a. With this exhaust valve 91, the outlet side port is connected to the exhaust port by the operation of the lever, and at all other times the outlet side port is closed.

The operation of the regulator 25, the operation of the exhaust valve 91, and the operation of the manual valve 90 allow the gas-charging component 20 to be charged and the compressed gas to be adjusted and supplied to the suspension 3a, and allow the air pressure of the suspension 3a to be freely adjusted according to the road surface or other such factors, so that optimal suspension characteristics are obtained at all times. Also, with a bicycle that has a rear suspension, adjusting the pressure of the air in the rear suspension allows high-pressure air to be put into the suspension to make it more rigid and reduce pedaling loss on uphill stretches, and allows lower-pressure air to be put in on downhill stretches and optimize the suspension for downhill riding.

While the above is a description of various embodiments of the present invention, various modifications may be employed. For example, the applications of the compressed air charged into the gas-charging component 20 are not limited to the above embodiments, and all applications that require compressed air, such as the supply of air to the tires, are included. With the above embodiments, the gas-charging component 20 was charged with less than 10 kg/cm$^2$ of air because air is easy to handle and is less expensive, but the gas that is charged is not limited to air, and may instead be carbon dioxide, helium, or another such gas. The present invention is not limited to a bicycle frame, and can also be applied to any other vehicle frame that is driven by human power, such as a motor-assisted bicycle or a tricycle. The gas-charging component 20 may be divided into a plurality of sections according to the intended application and use. In this case, the system may be such that the various gas storage components 20 are coupled in series via check valves, for example, the charging of the gas begins with the gas-charging component furthest upstream, and when the pressure of the compressed air in the gas-charging components further downstream drops, these components are charged from the upstream side.

Thus, the scope of the invention should not be limited to the specific embodiments disclosed. Instead, the true scope of the invention should be determined by the following claims.

What is claimed is:

1. A vehicle component used in a vehicle driven by human power comprising:
    a frame body having an interior sealed space for storing compressed gas;
    wherein the frame body includes:
        a head component for supporting a front wheel;
        a hollow down tube extending downward and rearward relative to the head component;
        a hollow top tube in fluid communication with the down tube and extending rearward relative to the head component above the down tube;
        a hollow seat tube in fluid communication with at least one of the down tube and the top tube and extending between rear sections of the down tube and the top tube;
        a bottom bracket component disposed at a junction between the down tube and the seat tube for supporting a bottom bracket axle;
    wherein the interior sealed space is formed by and extends into the down tube, the top tube and the seat tube;
    a gas inlet valve disposed at the rear section of the top tube and in fluid communication with the interior sealed space for selectively communicating gas into the interior sealed space; and
    a first gas supply opening disposed at a front section of the top tube and in fluid communication with the interior sealed space for selectively communicating gas out from the interior sealed space;
    a hollow seat stay that forks downward and rearward relative to the top tube, wherein the seat stay is in fluid communication with the top tube; and
    a hollow chain stay that forks rearward relative to the bottom bracket component, wherein the chain stay is in fluid communication with the down tube.

2. The vehicle component according to claim 1 further comprising a gas gauge in fluid communication with the first gas supply opening for indicating an amount of the compressed gas disposed within the interior sealed space.

3. The vehicle component according to claim 1 further comprising a pressure regulator in fluid communication with the first gas supply opening.

4. The vehicle component according to claim 1 further comprising a shifting device in fluid communication with the first gas supply opening for actuating a vehicle transmission with the compressed gas.

5. The vehicle component according to claim 1 further comprising a gas outlet valve in fluid communication with the first gas supply opening.

6. The vehicle component according to claim 1 further comprising an oil supply apparatus in fluid communication with the first gas supply opening for supplying oil in response to the compressed gas.

7. The vehicle component according to claim 1 further comprising a vehicle suspension in fluid communication with the first gas supply opening.

8. The vehicle component according to claim 1 further comprising a second gas supply opening disposed at the front section of the top tube and in fluid communication with the sealed space for selectively communicating the compressed gas from the sealed interior space.

9. The vehicle component according to claim 8 further comprising a gas gauge in fluid communication with the first gas supply opening for indicating an amount of the compressed gas disposed within the sealed space.

10. The vehicle component according to claim 9 further comprising a pressure regulator in fluid communication with the second gas supply opening.

11. The vehicle component according to claim 10 wherein the gas inlet valve comprises a schrader valve.

12. The vehicle frame according to claim 1 wherein the seat tube extends all the way between the down tube and the top tube and is in fluid communication with the down tube and the top tube.

13. The vehicle component according to claim 12 wherein the gas inlet valve is disposed in close proximity to the seat tube.

14. The vehicle component according to claim 1 further comprising a separate saddle fixing component coupled to the seat tube for coupling a saddle to the seat tube.

* * * * *